US010467529B2

(12) United States Patent
Lin et al.

(10) Patent No.: US 10,467,529 B2
(45) Date of Patent: Nov. 5, 2019

(54) CONVOLUTIONAL NEURAL NETWORK JOINT TRAINING

(71) Applicant: Adobe Inc., San Jose, CA (US)

(72) Inventors: Zhe Lin, Fremont, CA (US); Yufei Wang, La Jolla, CA (US); Radomir Mech, Mountain View, CA (US); Xiaohui Shen, San Jose, CA (US); Gavin Stuart Peter Miller, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 740 days.

(21) Appl. No.: 15/177,121

(22) Filed: Jun. 8, 2016

(65) Prior Publication Data

US 2017/0357892 A1    Dec. 14, 2017

(51) Int. Cl.
*G06N 3/08* (2006.01)
*G06N 3/04* (2006.01)

(52) U.S. Cl.
CPC ........... *G06N 3/084* (2013.01); *G06N 3/0454* (2013.01)

(58) Field of Classification Search
CPC .................................................. G06N 3/0454
See application file for complete search history.

(56) References Cited

U.S. PATENT DOCUMENTS

| 7,472,096 B2 * | 12/2008 | Burges ...................... G06N 3/08 706/20 |
| 8,503,539 B2 | 8/2013 | Tran |
| 9,031,953 B2 | 5/2015 | Rathnavelu et al. |
| 9,043,329 B1 | 5/2015 | Patton et al. |
| 9,535,960 B2 * | 1/2017 | Guo ....................... G06F 16/248 |
| 9,940,544 B2 | 4/2018 | Lin et al. |

(Continued)

OTHER PUBLICATIONS

Lu et al. "RAPID: Rating Pictorial Aesthetics using Deep Learning" MM'14 [Published Online 2014] [Retrieved Online 2019] <URL: http://infolab.stanford.edu/~wangz/project/imsearch/Aesthetics/ACMMM2014/lu.pdf> (Year: 2014).*

(Continued)

*Primary Examiner* — Scott A. Waldron
*Assistant Examiner* — Fen Christopher Tamulonis
(74) *Attorney, Agent, or Firm* — SBMC (57) ABSTRACT

In embodiments of convolutional neural network joint training, a computing system memory maintains different data batches of multiple digital image items, where the digital image items of the different data batches have some common features. A convolutional neural network (CNN) receives input of the digital image items of the different data batches, and classifier layers of the CNN are trained to recognize the common features in the digital image items of the different data batches. The recognized common features are input to fully-connected layers of the CNN that distinguish between the recognized common features of the digital image items of the different data batches. A scoring difference is determined between item pairs of the digital image items in a particular one of the different data batches. A piecewise ranking loss algorithm maintains the scoring difference between the item pairs, and the scoring difference is used to train CNN regression functions.

20 Claims, 4 Drawing Sheets

(56) References Cited

U.S. PATENT DOCUMENTS

| | | | |
|---|---|---|---|
| 2015/0294219 A1* | 10/2015 | Krizhevsky | G06N 3/084 706/25 |
| 2017/0357877 A1 | 12/2017 | Lin et al. | |
| 2018/0211135 A1 | 7/2018 | Lin et al. | |

OTHER PUBLICATIONS

Wang et al. "Unsupervised Learning of Visual Representations using Videos" ICCV 2015 [Published Online 2015] [Retrieved Online 2019] <URL: http://openaccess.thecvf.com/content_iccv_2015/papers/Wang_Unsupervised_Learning_of_ICCV_2015_paper.pdf> (Year: 2015).*

Xiong et al. "Recognize Complex Events from Static Images by Fusing Deep Channels" CVPR 2015 [Published Online 2015] [Retrieved Online 2019] <URL: https://www.cv-foundation.org/openaccess/content_cvpr_2015/papers/Xiong_Recognize_Complex_Events_2015_CVPR_paper.pdf> (Year: 2015).*

Zagoruyko et al. "Learning to Compare Image Patches via [CNN]" CVPR 2015 [Published Online 2015] [Retrieved Online 2019] <URL: https://www.cv-foundation.org/openaccess/content_cvpr_2015/papers/Zagoruyko_Learning_to_Compare_2015_CVPR_paper.pdf> (Year: 2015).*

Tzeng et al. "Simultaneous Deep Transfer Across Domains and Tasks" ICCV 2015 [Published Online 2015] [Retrieved Online 2019] <URL: https://people.eecs.berkeley.edu/~jhoffman/papers/Tzeng_ICCV2015.pdf> (Year: 2015).*

Wang et al. "Visual Tracking with Fully Convolutional Networks" ICCV 2015 [Published Online 2015] [Retrieved Online 2016] <URL: https://ieeexplore.ieee.org/stamp/stamp.jsp?tp=&arnumber=7410714> (Year: 2015).*

Chen, Si et al "Convolutional Neural Network and Convex Optimization" UCSD [Published 2014] [Retrieved online May 2019] <URL: https://pdfs.semanticscholar.org/548d/b490ef87f452bf8b12c797e2bb50ee98960a.pdf> (Year: 2014).*

Zagoruyko et al. "Learning to Compare Image Patches via Convolutional Neural Networks" CVPR 2015 [Published 2015] [Retrieved Online Aug. 2019] <URL: https://arxiv.org/abs/1504.03641> (Year: 2015).*

"Pre-Interview Communication", U.S. Appl. No. 15/177,197, dated Aug. 10, 2017, 3 pages.

"Notice of Allowance", U.S. Appl. No. 15/177,197, dated Nov. 27, 2017, 7 pages.

Chen,"Ranking Measures and Loss Functions in Learning to Rank", In Advances in Neural Information Processing Systems 22, 2009, 9 pages.

Krizhevsky,"ImageNet Classification with Deep Convolutional Neural Networks", In Advances in Neural Information Processing Systems 25, Dec. 3, 2012, 9 pages.

* cited by examiner

CONVOLUTIONAL NEURAL NETWORK JOINT TRAINING

BACKGROUND

In computing environments, users often initiate searches for images based on objects that may be displayed in the images and/or based on general themes of images. For example, a user may want to see ideas for planting flowers and may initiate an image search for "colorful flower garden", such as in a Web browser application. Likely, the images that are returned as a result of the image search will be images of colorful flowers arranged in a flower garden if the images are identified or labeled correctly. Typically, images are "tagged" with any number of identifiers that are intended to facilitate a search for an image based on the identifiers. For example, an image that is returned as part of the image search for "colorful flower garden" may have tags that include "flowers", "blue sky", "garden", "cat", "colorful", "gnome", and other tags that identify objects and/or themes shown in the particular image, and overall identify the image as a candidate image to return as an image search result.

With the proliferation of digital imaging, many thousands of images can be uploaded and made available for both private and public image searches. However, correctly identifying and tagging the images is a monumental and time-consuming task that is no longer viable using humans to review and label the ever-increasing stock of images. Further, conventional machine learning techniques used to analyze images and predict labels for unlabeled images also require vast amounts of human-generated training data for image predictions, which is time consuming and impractical for large data sets of unlabeled images. Additionally, the conventional machine learning techniques are prone to produce inaccurate image predictions due to the amount of required training data and/or due to the accuracy of the training data.

Increasingly, convolutional neural networks are being developed and trained for computer vision tasks, such as for the basic tasks of image classification, object detection, and scene recognition. Generally, a convolutional neural network is self-learning neural network of multiple layers that are progressively trained, for example, to initially recognize edges, lines, and densities of abstract features, and progresses to identifying object parts formed by the abstract features from the edges, lines, and densities. As the self-learning and training progresses through the many neural layers, the convolutional neural network can begin to detect objects and scenes, such for object and image classification. Additionally, once the convolutional neural network is trained to detect and recognize particular objects and classifications of the particular objects, multiple images can be processed through the convolutional neural network for object identification and image classification.

SUMMARY

Convolutional neural network joint training is described. In embodiments, the classifier layers (also referred to herein as the neural layers) of a convolutional neural network are trained simultaneously on different data types. A computing system includes memory to maintain different data batches each including multiple digital image items. The different data batches can be event types of different events, and the multiple digital image items of an event type can be groups of digital images each associated with a type of the event, such as a family vacation, a nature hike, a wedding, a birthday, or other type of gathering. Similarly, the multiple digital image items of an event type can be digital videos each associated with a type of the event. Generally, the multiple digital image items (e.g., the digital images or digital videos) of the different data batches have some common features. A convolutional neural network is implemented by the computing system to receive input of the multiple digital image items of the different data batches. The classifier layers of the convolutional neural network are trained to recognize the common features in the multiple digital image items of the different data batches.

The convolutional neural network can receive an input of the multiple digital image items of the different data batches, where the digital image items are interleaved in a sequence of item subsets from different ones of the different data batches. The classifier layers of the convolutional neural network can then be trained based on the input of the sequential interleaved item subsets. Alternatively, the convolutional neural network can receive the input of the multiple digital image items of the different data batches, where the digital image items are interleaved as item subsets from random different ones of the different data batches. The classifier layers of the convolutional neural network can then be trained based on the input of the random interleaved item subsets.

In addition to the classifier layers of the convolutional neural network that are jointly trained, the convolutional neural network also includes fully-connected layers, each corresponding to one of the different data batches. The classifier layers of the convolutional neural network include layers to classify low-level, mid-level, and high-level features. Generally, the low-level layers initially recognize edges, lines, colors, and/or densities of abstract features, and the mid-level and high-level layers progressively learn to identify object parts formed by the abstract features from the edges, lines, colors, and/or densities. As the self-learning and training of the convolutional neural network progresses through the classifier layers, the fully-connected layers of the convolutional neural network can detect objects and scenes, such as for object detection and image classification.

The classifier layers of the convolutional neural network are trained simultaneously on all of the multiple digital image items of the different data batches, except for the fully-connected layers. The fully-connected layers receive input of the recognized common features, as determined by the classifier layers of the convolutional neural network. The fully-connected layers can distinguish between the recognized common features of multiple digital image items of the different data batches (e.g., distinguish between digital images of an event, or distinguish between image frames of digital videos of the event). For example, the fully-connected layers of the convolutional neural network can distinguish the wedding flowers determined in the digital images of a wedding event from wild flowers determined in the digital images of a nature hike event.

In other aspects of convolutional neural network joint training, the convolutional neural network is implemented as two identical neural networks that share a same set of layer parameters. Item pairs of the multiple digital image items in a particular one of the different data batches can be input to the two identical neural networks that each generate an item score for each of the item pairs. A scoring difference can be determined between the item pairs of the multiple digital image items and a piecewise ranking loss algorithm can be utilized to maintain the scoring difference between the item pairs of the multiple digital image items if the scoring difference between an item pair exceeds a margin. The maintained scoring difference can be used to train regression functions of the convolutional neural network by back propagating the maintained scoring difference as a feed-back loop into the fully-connected layers of the convolutional neural network.

BRIEF DESCRIPTION OF THE DRAWINGS

Embodiments of convolutional neural network joint training are described with reference to the following Figures. The same numbers may be used throughout to reference like features and components that are shown in the Figures.

DETAILED DESCRIPTION

Embodiments of convolutional neural network joint training are implemented to provide a progressive training technique, as well as a novel rank loss function, for convolutional neural networks. A convolutional neural network is a machine learning computer algorithm implemented for self-learning with multiple layers that run logistic regression on data to learn features and train parameters of the network. The self-learning aspect is also referred to as unsupervised feature learning because the input is unknown to the convolutional neural network, in that the network is not explicitly trained to recognize or classify the data features, but rather trains and learns the data features from the input.

The multiple layers of a convolutional neural network, also referred to as neural layers, classifiers, or feature representations, include classifier layers to classify low-level, mid-level, and high-level features, as well as trainable classifiers in fully-connected layers. The low-level layers initially recognize edges, lines, colors, and/or densities of abstract features, and the mid-level and high-level layers progressively learn to identify object parts formed by the abstract features from the edges, lines, colors, and/or densities. As the self-learning and training progresses through the many classifier layers, the convolutional neural network can begin to detect objects and scenes, such as for object detection and image classification with the fully-connected layers. Additionally, once the convolutional neural network is trained to detect and recognize particular objects and classifications of the particular objects, multiple digital images can be processed through the convolutional neural network for object identification and image classification.

In embodiments of convolutional neural network joint training, the classifier layers of a convolutional neural network are trained simultaneously on different data types. As convolutional neural networks continue to be developed and refined, the aspects of convolutional neural network joint training described herein can be applied to existing and new convolutional neural networks. Multiple digital image items of different data batches can be input to a convolutional neural network and the classifier layers of the convolutional neural network are jointly trained to recognize common features in the multiple digital image items of the different data batches. As noted above, the different data batches can be event types of different events, and the multiple digital image items of an event type may be groups of digital images, or digital videos, each associated with a type of the event. Generally, the multiple digital image items (e.g., the digital images or digital videos) of the different data batches have some common features. In other instances, the different data batches may be data sources other than digital images (e.g., digital photos) or digital videos. For example, the different data batches may include categories of data, meta-data (tags), computer graphic sketches, three-dimensional models, sets of parameters, audio or speech-related data, and/or various other types of data sources. Further, the data batches may be based on time or a time duration. In general, the context of convolutional neural network joint training can be utilized to search any assets for which there is a meaningful and/or determinable interdependence.

The convolutional neural network can receive an input of the multiple digital image items of the different data batches, where the digital image items are interleaved in a sequence of item subsets from different ones of the different data batches. The classifier layers of the convolutional neural network can be jointly trained based on the input of these sequentially interleaved item subsets. Alternatively, the convolutional neural network can receive the input of the multiple digital image items of the different data batches, where the digital image items are interleaved as item subsets from random different ones of the different data batches. In this instance, the classifier layers of the convolutional neural network can be jointly trained based on the input of the random interleaved item subsets. The fully-connected layers of the convolutional neural network receive input of the recognized common features, as determined by the layers (e.g., classifiers) of the convolutional neural network. The fully-connected layers can distinguish between the recognized common features of multiple items of the different data batches.

Additionally, an existing or new convolutional neural network may be implemented with a piecewise ranking loss algorithm. Generally, ranking is used in machine learning, such as when training a convolutional neural network. A ranking function can be developed by minimizing a loss function on the training data that is used to train the convolutional neural network. Then, given the digital image items as input to the convolutional neural network, the ranking function can be applied to generate a ranking of the digital image items. In the disclosed aspects of convolutional neural network joint training, the ranking function is a piecewise ranking loss algorithm is derived from support vector machine (SVM) ranking loss, which is a loss function defined on the basis of pairs of objects whose rankings are different. The piecewise ranking loss algorithm is implemented for the convolutional neural network training to determine a relative ranking loss when comparing the digital image items from a batch of the items. The piecewise ranking loss algorithm implemented for convolutional neural network training improves the overall classification of the digital image items as performed by the fully-connected layers of the convolutional neural network. A convolutional neural network can also be implemented to utilize back propagation as a feed-back loop into the fully-connected layers of the convolutional neural network. The output generated by the piecewise ranking loss algorithm can be back propagated into the fully-connected layers to train regression functions of the convolutional neural network.

While features and concepts of convolutional neural network joint training can be implemented in any number of different devices, systems, networks, environments, and/or configurations, embodiments of convolutional neural network joint training are described in the context of the following example devices, systems, and methods.

Figure 1:
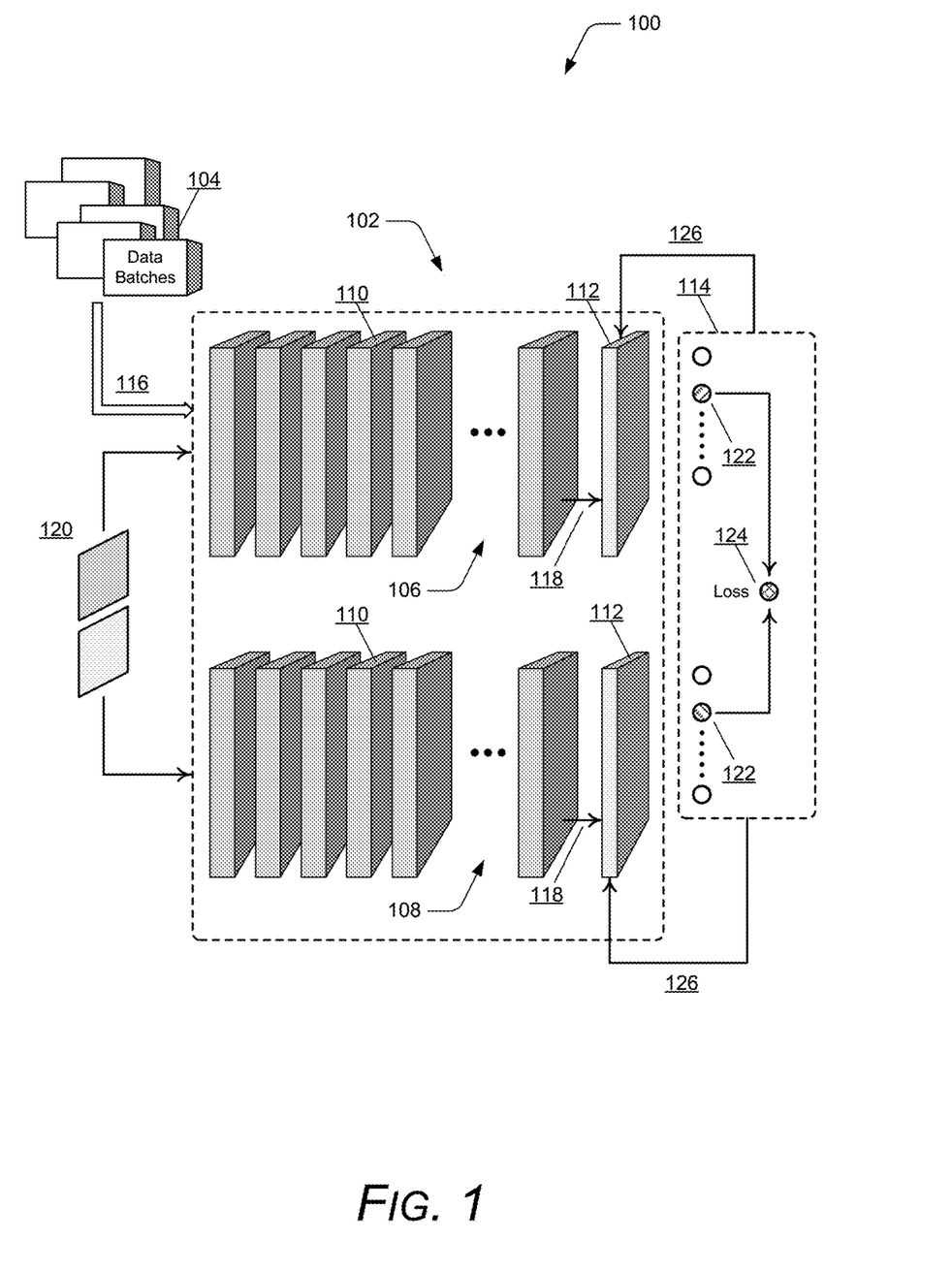
FIG. 1 illustrates an example system in which embodiments of convolutional neural network joint training can be implemented.

FIG. 1 illustrates an example system 100 that includes a convolutional neural network 102 in which embodiments of convolutional neural network joint training can be implemented. Generally, a convolutional neural network is a computer algorithm implemented for self-learning with multiple layers that run logistic regression on data to learn features and train parameters of the network. In aspects of convolutional neural network joint training, the convolutional neural network 102 can be utilized to rate image aesthetics or any other image attributes, used for image classification, image recognition, domain adaptation, and to recognize the difference between photos and graphic images. In this example system 100, the data is different data batches 104 of multiple digital image items. In implementations, the different data batches 104 can be event types of different events, and the multiple digital image items of an event type can be groups of digital images each associated with a type of the event, such as a family vacation, a nature hike, a wedding, a birthday, or other type of gathering. Similarly, the multiple digital image items of an event type may be digital videos each associated with a type of the event. Generally, the multiple digital image items (e.g., the digital images or digital videos) of the different data batches 104 have some common features.

In other instances, the data batches 104 may include data sources other than digital images (e.g., digital photos) or digital videos. For example, the different data batches may include categories of data, metadata (tags), computer graphic sketches, three-dimensional models, sets of parameters, audio or speech-related data, and/or various other types of data sources. Further, the data batches may be based on time or a time duration. In general, the context of convolutional neural network joint training can be utilized to search any assets, such as the different data batches 104, for which there is a meaningful and/or determinable interdependence.

In this example system 100, the convolutional neural network 102 is implemented as two identical neural networks 106, 108 that share a same set of layer parameters of the respective network layers. As described herein, the two neural networks 106, 108 are collectively referred to in the singular as the convolutional neural network 102, and each of the neural networks include multiple classifier layers 110, fully-connected layers 112, and optionally, a layer to implement a piecewise ranking loss algorithm 114. The convolutional neural network 102 can receive an input 116 of the multiple digital image items of the different data batches 104. The classifier layers 110 of the convolutional neural network are jointly trained to recognize the common features in the multiple digital image items of the different data batches.

The multiple classifier layers 110 of the convolutional neural network 102, also referred to as neural layers, classifiers, or feature representations, include layers to classify low-level, mid-level, and high-level features, as well as trainable classifiers in the fully-connected layers 112. The low-level layers initially recognize edges, lines, colors, and/or densities of abstract features, and the mid-level and high-level layers progressively learn to identify object parts formed by the abstract features from the edges, lines, colors, and/or densities. As the self-learning and training progresses through the many classifier layers, the convolutional neural network 102 can begin to detect objects and scenes, such as for object detection and image classification with the fully-connected layers. The low-level features of the classifier layers 110 can be shared across the neural networks 106, 108 of the convolutional neural network 102. The high-level features of the fully-connected layers 112 that discern meaningful labels and clusters of features can be used to discriminate between the different batch types, or generically discriminate between any type of assets.

The fully-connected layers 112 of the convolutional neural network 102 (e.g., the two neural networks 106, 108) each correspond to one of the different data batches 104. The fully-connected layers 112 receive input 118 of the recognized common features, as determined by the classifier layers 110 of the convolutional neural network. The fully-connected layers 112 can distinguish between the recognized common features of multiple digital image items of the different data batches 104 (e.g., distinguish between digital images of an event, or distinguish between image frames of digital videos of the event).

In aspects of convolutional neural network joint training, the classifier layers 110 of the convolutional neural network 102 are trained simultaneously on all of the multiple digital image items of the different data batches. The fully-connected layers 112 can continue to be trained based on outputs of the convolutional neural network being back propagated into the fully-connected layers that distinguish digital image items within a batch type. The joint training of the convolutional neural network 102 trains the neural network in a hierarchical way, allowing the digital image items of the data batches 104 to be mixed initially in the classifier layers 110 (e.g., the low-level features) of the neural network. This can be used initially to train the convolutional neural network to predict importance of digital images, for example, without the digital images being associated with an event type. The feature sharing reduces the number of parameters in the convolutional neural network 102 and regularizes the network training, particularly for the high variance of digital image item types among the data batches 104 and for relatively small datasets.

The convolutional neural network 102 can receive an input of the multiple digital image items of the different data batches 104 interleaved in a sequence of item subsets from different ones of the different data batches. The classifier layers 110 of the convolutional neural network are trained based on the input of these sequentially interleaved item subsets. Alternatively, the convolutional neural network 102 can receive the input of the multiple digital image items of the different data batches 104 interleaved as item subsets from random different ones of the different data batches. In this instance, the classifier layers 110 of the convolutional neural network are trained based on the input of the random interleaved item subsets. The input of the multiple digital image items can be interleaved in sequence or interleaved randomly to prevent the convolutional neural network 102 from becoming biased toward one type of digital image item or set of digital image items, and the training iterations develop the classifier layers 110 of the convolutional neural network gradually over time, rather than changing abruptly. In implementations, interleaving the input of the digital image items can be a gradient descent-based method to train the weight so that it is gradually updated. This is effective to avoid bias during training of the convolutional neural network and to avoid overfitting the data items for smaller data batches.

In embodiments, an existing or new convolutional neural network may be implemented with the piecewise ranking loss algorithm 114. Generally, ranking is used in machine learning, such as when training a convolutional neural network. A ranking function can be developed by minimizing a loss function on the training data that is used to train the convolutional neural network. Then, given the digital image items as input to the convolutional neural network, the ranking function can be applied to generate a ranking of the digital image items. In the disclosed aspects of convolutional neural network joint training, the ranking function is a piecewise ranking loss algorithm is derived from support vector machine (SVM) ranking loss, which is a loss function defined on the basis of pairs of objects whose rankings are different.

In this example system 100, the two identical neural networks 106, 108 of the convolutional neural network 102 receive item pairs 120 of the multiple digital image items of one of the different data batches 104. Each of the neural networks 106, 108 generate an item score 122 for one of the item pairs. The piecewise ranking loss algorithm 114 can determine a scoring difference 124 (e.g., determined as a "loss") between the item pairs of the multiple digital image items. The piecewise ranking loss algorithm 114 is utilized to maintain the scoring difference between the item pairs 120 if the score difference between an item pair exceeds a margin. The piecewise ranking loss algorithm 114 determines a relative ranking loss when comparing the digital image items from a batch of the items. The scoring difference between an item pair is relative, and a more reliable indication for determining item importance.

In this example system 100, the convolutional neural network 102 is also implemented to utilize back propagation 126 as a feed-back loop into the fully-connected layers 112 of the convolutional neural network. The scoring difference 124 output of the piecewise ranking loss algorithm 114 is back-propagated 126 to train regression functions of the fully-connected layers 112 of the convolutional neural network 102. The piecewise ranking loss algorithm 114 can evaluate every possible image pair of the digital image items with any score difference from a data batch 104.

As noted above, the piecewise ranking loss algorithm 114 is derived from SVM (support vector machine) ranking loss, and in implementations of SVM ranking loss, the item pairs 120 selected for training are image pairs with a score difference larger than a margin, where $D_g = G(I_1) - G(I_2) > \text{margin}$. The loss function is as in Equation (1):

$$L(I_1, I_2) = \tfrac{1}{2}\{\max(0, \text{margin} - D_p)\}^2, D_g > \text{margin}$$

$$D_p = P(I_1) - P(I_2)$$

where P is the predicted importance score of an image, which is just the penultimate layer of the network, and $(I_1; I_2)$ are the input image pair sorted by scores. The loss functions of SVM ranking loss have the following form:

$$L^p(f; x; \mathcal{L}) = \sum_{s=1}^{n-1} \sum_{i=1, l(i)<l(s)}^{n} \phi(f(x_s) - f(x_i))$$

where the $\phi$ functions are hinge function ($\phi(z)=(1-z)_+$), exponential function ($\phi(z)=e^{-z}$), and logistic function ($\phi(z)=\log(1+e^{-z})$) respectively, for the three algorithms.

Then, the piecewise ranking loss implementation is as in Equation (2):

$$L(I_1, I_2) = \begin{cases} \tfrac{1}{2}\{\max(0, |D_p| - \text{margin}_1)\}^2, & D_g < \text{margin}_1 \\ \tfrac{1}{2}\{\max(0, \text{margin}_1 - D_p)\}^2 + \tfrac{1}{2}\{\max(0, D_p - \text{margin}_2)\}^2, & \text{margin}_1 < D_g < \text{margin}_2 \\ \tfrac{1}{2}\{\max(0, \text{margin}_2 - D_p)\}^2, & D_g > \text{margin}_2 \end{cases}$$

where $\text{margin}_1 < \text{margin}_2$ are the similar, different margins, respectively. The piecewise ranking loss algorithm 114 makes use of image pairs with any score difference. For a score difference between an item pair $D_g = s1 - s2$, the piecewise ranking loss algorithm determines a predicted scoring difference $D_p$ similar to $D_g$. If the score difference $D_g$ is small (i.e., $D_g < \text{margin}1$), the predicted loss reduces the predicted scoring difference $D_p$. If the score difference $D_g$ is large (i.e., $D_g > \text{margin}2$), the piecewise ranking loss algorithm increases the predicted scoring difference $D_p$ and penalizes it when $D_p < \text{margin}2$. Similarly, when $D_g$ is in the range between margin1 and margin2, the piecewise ranking loss algorithm determines the predicted scoring difference $D_p$ also within that range. The implementation of piecewise ranking loss trained on the different data batches 104 outperforms both SVM ranking loss and a baseline KNN-based method. The objective loss function of the piecewise ranking loss algorithm provides an error signal even when image pairs have the same rating, moving them closer together in representational space, rather than training only on images with different ratings. This introduces a relaxation in the scoring, thus making the convolutional neural network more stable, which is beneficial when the ratings are subjective.

Figure 2:
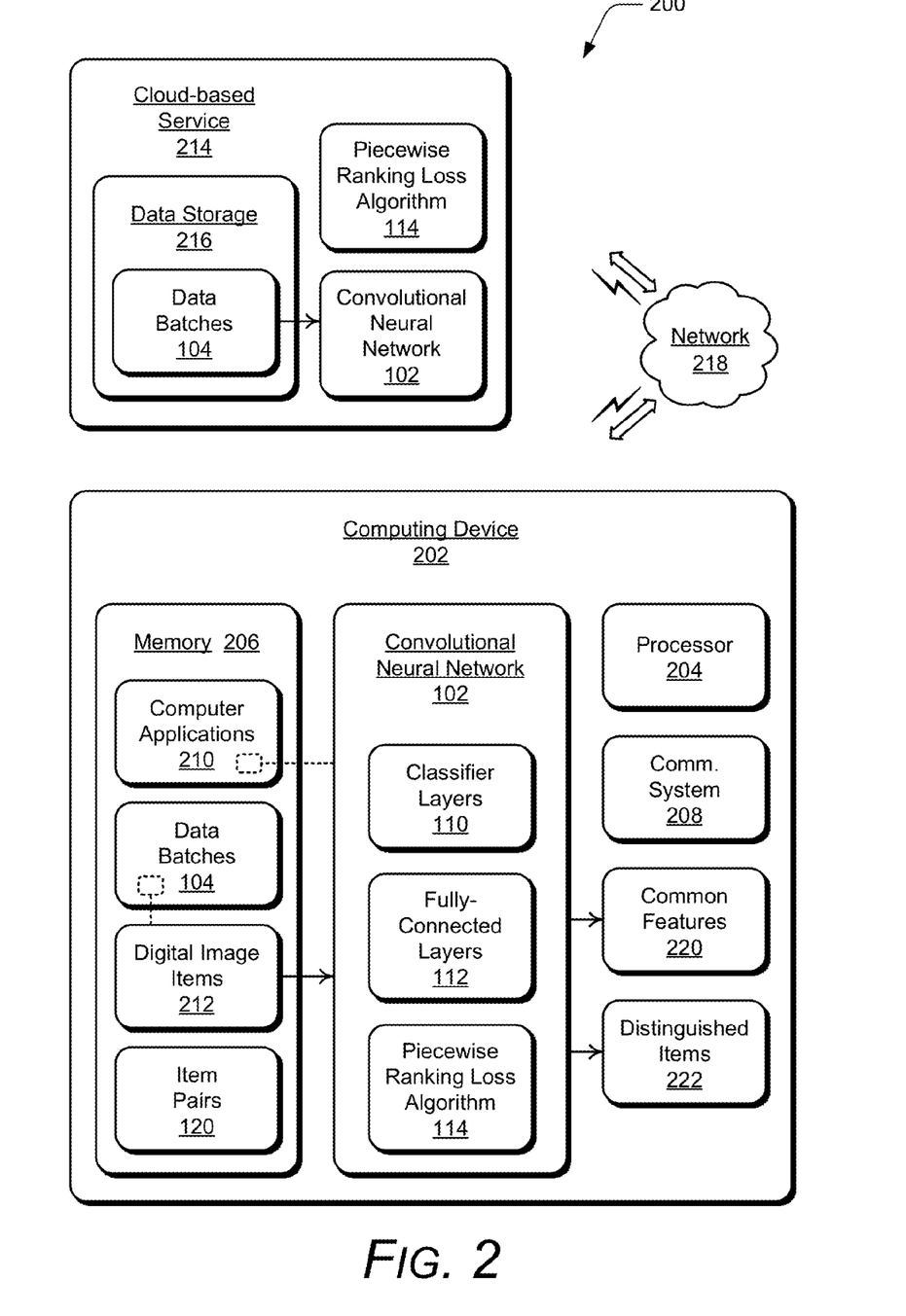
FIG. 2 illustrates another example system in which embodiments of convolutional neural network joint training can be implemented.

FIG. 2 illustrates an example system 200 in which embodiments of convolutional neural network joint training can be implemented. The example system 200 includes a computing device 202, such as a computer device that implements the convolutional neural network 102 as a computer algorithm implemented for self-learning, as shown and described with reference to FIG. 1. The computing device 202 can be implemented with various components, such as a processor 204 (or processing system) and memory 206, and with any number and combination of differing components as further described with reference to the example device shown in FIG. 4. Although not shown, the computing device 202 may be implemented as a mobile or portable device and can include a power source, such as a battery, to power the various device components. Further, the computing device 202 can include different wireless radio systems, such as for Wi-Fi, Bluetooth™, Mobile Broadband, LTE, or any other wireless communication system or format. Generally, the computing device 202 implements a communication system 208 that includes a radio device, antenna, and chipset that is implemented for wireless communication with other devices, networks, and services.

As described herein, the techniques for convolutional neural network joint training provide a progressive training technique (e.g., joint training), which may be implemented for existing and new convolutional neural networks. The disclosed techniques also include implementation of the piecewise ranking loss algorithm 114 as a layer of the convolutional neural network 102. The computing device 202 includes one or more computer applications 210, such as the convolutional neural network 102 and the piecewise ranking loss algorithm 114 to implement the techniques for convolutional neural network joint training. The convolutional neural network 102 and the piecewise ranking loss algorithm 114 can each be implemented as software applications or modules (or implemented together), such as computer-executable software instructions that are executable with the processor 204 (or with a processing system) to implement embodiments of the convolutional neural network described herein. The convolutional neural network 102 and the piecewise ranking loss algorithm 114 can be stored on computer-readable storage memory (e.g., the device memory 206), such as any suitable memory device or electronic data storage implemented in the computing device. Although shown as an integrated module or component of the convolutional neural network 102, the piecewise ranking loss algorithm 114 may be implemented as a separate module or component with any of the computer applications 210.

In embodiments, the convolutional neural network 102 (e.g., the two neural networks 106, 108) is implemented to receive an input of the multiple digital image items 212 of the different data batches 104 that are stored in the memory 206 of the computing device 202. Alternatively or in addition, the convolutional neural network 102 may receive multiple digital image items of the different data batches as input from a cloud-based service 214. The example system 200 can include the cloud-based service 214 that is accessible by client devices, to include the computing device 202. The cloud-based service 214 includes data storage 216 that may be implemented as any suitable memory, memory device, or electronic data storage for network-based data storage. The data storage 216 can maintain the data batches 104 each including the digital image items 212. The cloud-based service 214 can implement an instance of the convolutional neural network 102, to include the piecewise ranking loss algorithm 114, as network-based applications that are accessible by a computer application 210 from the computing device 202.

The cloud-based service 214 can also be implemented with server devices that are representative of one or multiple hardware server devices of the service. Further, the cloud-based service 214 can be implemented with various components, such as a processing system and memory, as well as with any number and combination of differing components as further described with reference to the example device shown in FIG. 4 to implement the services, applications, servers, and other features of convolutional neural network joint training. In embodiments, aspects of convolutional neural network joint training as described herein can be implemented by the convolutional neural network 102 at the cloud-based service 214 and/or may be implemented in conjunction with the convolutional neural network 102 that is implemented by the computing device 202.

The example system 200 also includes a network 218, and any of the devices, servers, and/or services described herein can communicate via the network, such as for data communication between the computing device 202 and the cloud-based service 214. The network can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

In embodiments, the convolutional neural network 102 (e.g., the two neural networks 106, 108) receives an input of the multiple digital image items 212 of the different data batches 104. The classifier layers 110 of the convolutional neural network are trained to recognize the common features 220 in the multiple digital image items of the different data batches. Generally, the multiple digital image items of the data batches 104 have some common features. The classifier layers 110 of the convolutional neural network 102 are trained simultaneously on all of the multiple digital image items of the different data batches 104, except for the fully-connected layers 112. The fully-connected layers 112 of the convolutional neural network 102 each correspond to one of the different data batches. The fully-connected layers 112 receive input of the recognized common features 220, as determined by the classifier layers of the convolutional neural network. The fully-connected layers 112 can distinguish items 222 between the recognized common features of the multiple digital image items of the different data batches (e.g., distinguish between digital images of an event, or distinguish between image frames of digital videos of the event).

Example method 300 is described with reference to FIG. 3 in accordance with one or more embodiments of convolutional neural network joint training. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
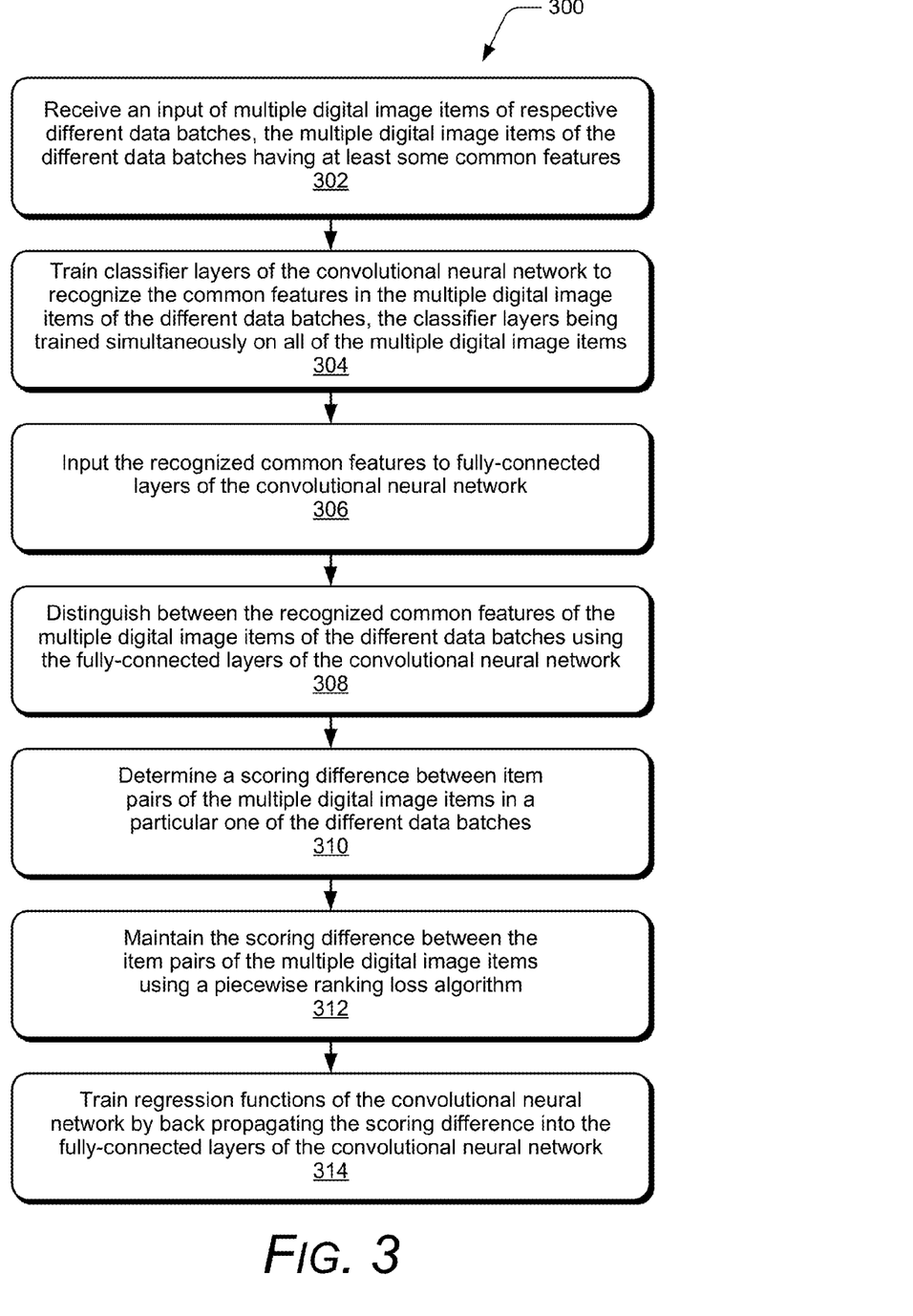
FIG. 3 illustrates example methods of convolutional neural network joint training in accordance with one or more embodiments of the techniques described herein.

FIG. 3 illustrates example method(s) 300 of convolutional neural network joint training, and is generally described with reference to the convolutional neural network implemented in the example system of FIG. 1. The order in which the method is described is not intended to be construed as a limitation, and any number or combination of the method operations can be combined in any order to implement a method, or an alternate method.

At 302, an input of multiple digital image items of respective different data batches is received, where the multiple digital image items of the different data batches have at least some common features. For example, the convolutional neural network 102 receives the input 116 of the multiple digital image items from the different data batches 104. In implementations, the different data batches 104 can be event types of different events. The multiple digital image items of an event type can be groups of digital images each associated with a type of the event, such as a family vacation, a nature hike, a wedding, a birthday, or other type of gathering. Similarly, the multiple digital image items of an event type may be digital videos each associated with a type of the event. Generally, the multiple digital image items (e.g., the digital images or digital videos) of the different data batches 104 have some common features with the multiple digital image items of the other different data batches. Further, the convolutional neural network 102 can receive the input 116 of the multiple digital image items from the different data batches 104 interleaved in a sequence of item subsets from different ones of the different data batches. Alternatively, the convolutional neural network can receive the input 116 of the multiple digital image items of the respective different data batches 104 interleaved as item subsets from random different ones of the different data batches.

At 304, classifier layers of the convolutional neural network are trained to recognize the common features in the multiple digital image items of the different data batches, the classifier layers being trained simultaneously on all of the multiple digital image items of the different data batches. For example, the classifier layers 110 of the convolutional neural network 102 are trained simultaneously except for the fully-connected layers 112. The classifier layers 110 are trained to recognize the common features 220 in the multiple digital image items of the different data batches 104. The training of the classifier layers 110 of the convolutional neural network 102 can be based on the input of the sequential interleaved item subsets, or the training of the classifier layers 110 can be based on the input of the random interleaved item subsets.

At 306, the recognized common features are input to the fully-connected layers of the convolutional neural network. Further, at 308, the recognized common features of the multiple digital image items of the different data batches are distinguished using the fully-connected layers of the convolutional neural network. For example, the fully-connected layers 112 of the convolutional neural network 102 receive input 118 of the recognized common features 220. Each of the fully-connected layers 112 corresponds to a different one of the data batches 104 and is implemented to distinguish between the multiple digital image items of a respective one of the data batches, such as to distinguish between the digital images of an event or to distinguish between the image frames of digital videos of an event.

At 310, a scoring difference is determined between item pairs of the multiple digital image items in a particular one of the different data batches. For example, the convolutional neural network 102 is implemented as the two identical neural networks 106, 108 that share a same set of layer parameters of the respective network layers (e.g., the classifier layers 110 and the fully-connected layers 112). The two neural networks 106, 108 of the convolutional neural network 102 receive item pairs 120 of the multiple digital image items of one of the different data batches 104. Each of the neural networks 106, 108 generate an item score 122 for an item pair of the multiple digital image items from a particular one of the different data batches.

At 312, the scoring difference between the item pairs of the multiple digital image items is maintained with implementations of a piecewise ranking loss algorithm. For example, the convolutional neural network 102 implements the piecewise ranking loss algorithm 114 that determines the scoring difference 124 (e.g., determined as a "loss") between the item pairs of the multiple digital image items. The piecewise ranking loss algorithm 114 maintains the scoring difference between the item pairs 120 of the multiple digital image items if the score difference between the item pair exceeds a margin.

At 314, regression functions of the convolutional neural network are trained by back propagating the maintained scoring difference into the fully-connected layers of the convolutional neural network. For example, the convolutional neural network 102 utilizes back propagation 126 as a feed-back loop to back propagate the scoring difference 124 output from the piecewise ranking loss algorithm 114 into the fully-connected layers 112 of the convolutional neural network 102 to train regression functions of the convolutional neural network.

Figure 4:
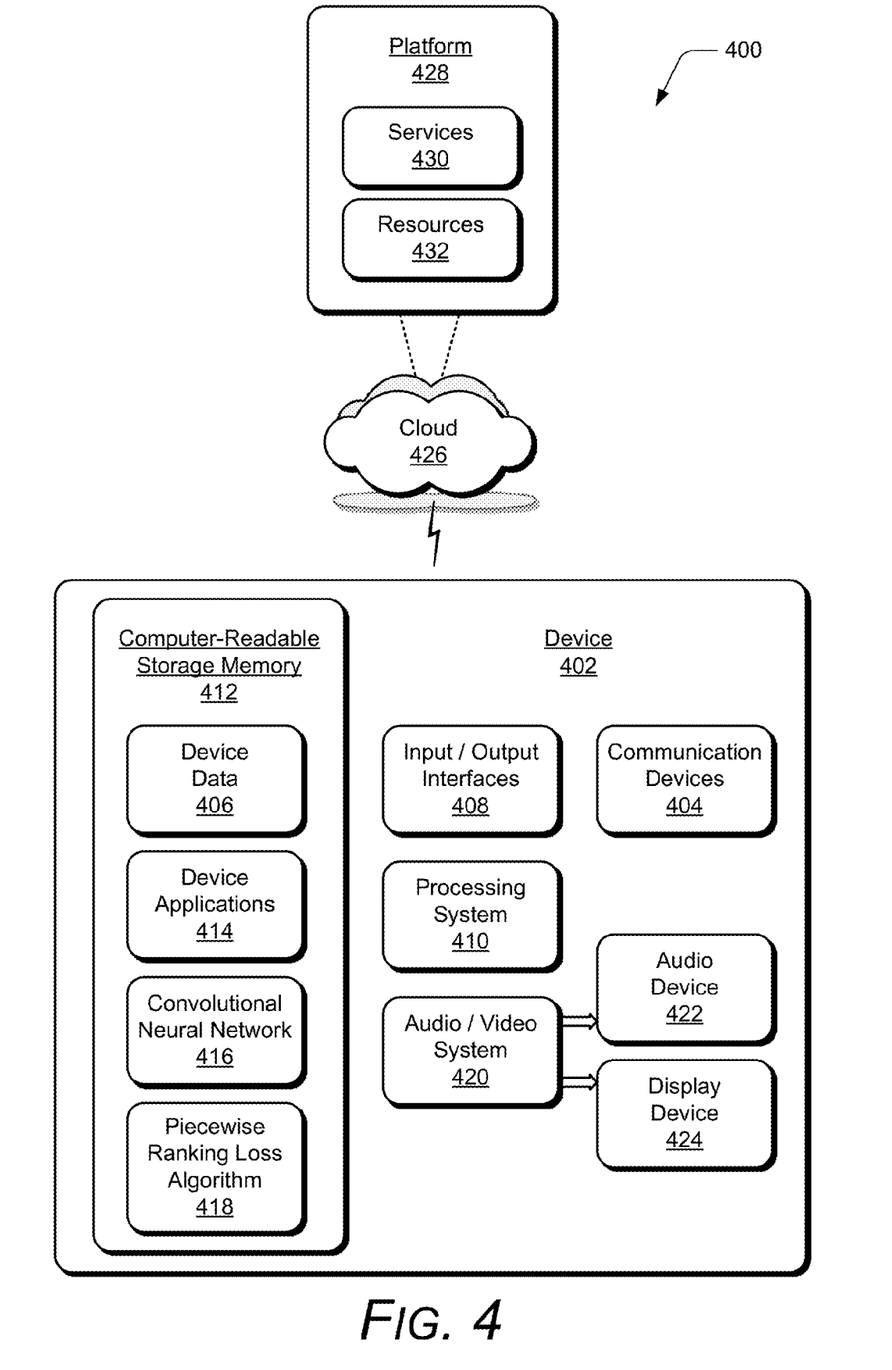
FIG. 4 illustrates an example system with an example device that can implement embodiments of convolutional neural network joint training.

FIG. 4 illustrates an example system 400 that includes an example device 402, which can implement embodiments of convolutional neural network joint training. The example device 402 can be implemented as any of the computing devices and/or services (e.g., server devices) described with reference to the previous FIGS. 1-3, such as the computing device 202 and/or server devices of the cloud-based service 214.

The device 402 includes communication devices 404 that enable wired and/or wireless communication of device data 406, such as the data batches 104 and other computer applications content that is maintained and/or processed by computing devices. The device data can include any type of audio, video, image, and/or graphic data that is generated by applications executing on the device. The communication devices 404 can also include transceivers for cellular phone communication and/or for network data communication.

The device 402 also includes input/output (I/O) interfaces 408, such as data network interfaces that provide connection and/or communication links between the example device 402, data networks, and other devices. The I/O interfaces can be used to couple the device to any type of components, peripherals, and/or accessory devices, such as a digital camera device that may be integrated with device 402. The I/O interfaces also include data input ports via which any type of data, media content, and/or inputs can be received, such as user inputs to the device, as well as any type of audio, video, image, and/or graphic data received from any content and/or data source.

The device 402 includes a processing system 410 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 402 may further include any type of a system bus or other data and command transfer system that couples the various components within the device. A system bus can include any one or combination of different bus structures and architectures, as well as control and data lines.

The device 402 also includes computer-readable storage memory 412, such as data storage devices that can be accessed by a computing device, and that provide persistent storage of data and executable instructions (e.g., software applications, modules, programs, functions, and the like). The computer-readable storage memory 412 described herein excludes propagating signals. Examples of computer-readable storage memory 412 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 412 provides storage of the device data 406 and various device applications 414, such as an operating system that is maintained as a software application with the computer-readable storage memory and executed by the processing system 410. In this example, the device applications also include a convolutional neural network 416 that implements embodiments of convolutional neural network joint training, and in some implementations utilizes a piecewise ranking loss algorithm 418, such as when the example device 402 is implemented as the computing device 202 shown and described with reference to FIGS. 2 and 3. Examples of the convolutional neural network 416 and the piecewise ranking loss algorithm 418 include the convolutional neural network 102 and the piecewise ranking loss algorithm 114 that are implemented by the computing device 202 and/or by the cloud-based service 214, as shown and described with reference to FIG. 2.

The device 402 also includes an audio and/or video system 420 that generates audio data for an audio device 422 and/or generates display data for a display device 424. The audio device and/or the display device include any devices that process, display, and/or otherwise render audio, video, display, and/or image data, such as the image content of an animation object. In implementations, the audio device and/or the display device are integrated components of the example device 402. Alternatively, the audio device and/or the display device are external, peripheral components to the example device. In embodiments, at least part of the techniques described for convolutional neural network joint training may be implemented in a distributed system, such as over a "cloud" 426 in a platform 428. The cloud 426 includes and/or is representative of the platform 428 for services 430 and/or resources 432. For example, the services 430 may include the cloud-based service shown and described with reference to FIG. 2.

The platform 428 abstracts underlying functionality of hardware, such as server devices (e.g., included in the services 430) and/or software resources (e.g., included as the resources 432), and connects the example device 402 with other devices, servers, etc. The resources 432 may also include applications and/or data that can be utilized while computer processing is executed on servers that are remote from the example device 402. Additionally, the services 430 and/or the resources 432 may facilitate subscriber network services, such as over the Internet, a cellular network, or Wi-Fi network. The platform 428 may also serve to abstract and scale resources to service a demand for the resources 432 that are implemented via the platform, such as in an interconnected device embodiment with functionality distributed throughout the system 400. For example, the functionality may be implemented in part at the example device 402 as well as via the platform 428 that abstracts the functionality of the cloud 426.

Although embodiments of convolutional neural network joint training have been described in language specific to features and/or methods, the appended claims are not necessarily limited to the specific features or methods described. Rather, the specific features and methods are disclosed as example implementations of convolutional neural network joint training, and other equivalent features and methods are intended to be within the scope of the appended claims. Further, various different embodiments are described and it is to be appreciated that each described embodiment can be implemented independently or in connection with one or more other described embodiments.

The invention claimed is:

1. A computing system implemented for convolutional neural network joint training, the system comprising:
    memory configured to maintain different data batches each including multiple digital image items, the multiple digital image items of the different data batches having at least some common features;
    a processor system to implement a dual-channel convolutional neural network configured to:
        receive input of the multiple digital image items of the different data batches, the input configured as an interleaved sequence of item pairs of the multiple digital image items from at least one of the different data batches, a first digital image item of an item pair being input to a first channel of the dual-channel convolutional neural network and a second digital image item of the item pair being input to a second channel of the dual-channel convolutional neural network;
        train classifier layers of the dual-channel convolutional neural network to recognize the common features in the multiple digital image items of the different data batches;
        input the recognized common features to fully-connected layers of the dual-channel convolutional neural network, each of the fully-connected layers corresponding to a different one of the different data batches, the fully-connected layers configured to distinguish between the multiple digital image items of the different data batches based on the recognized common features in the multiple digital image items;
        determine a scoring difference between the item pairs of the multiple digital image items in the at least one of the different data batches;
        utilize a piecewise ranking loss algorithm to maintain the scoring difference between the item pairs of the multiple digital image items; and
        train regression functions of the dual-channel convolutional neural network by back propagating the scoring difference into the fully connected layers of the dual-channel convolutional neural network.

2. The computing system as recited in claim 1, wherein:
    the classifier layers of the dual-channel convolutional neural network are trained simultaneously on all of the multiple digital image items of the different data batches, except for the fully-connected layers of the dual-channel convolutional neural network; and
    the fully-connected layers of the dual-channel convolutional neural network are configured to distinguish between the multiple digital image items of the at least one of the different data batches that corresponds to a respective one of the fully-connected layers.

3. The computing system as recited in claim 1, wherein:
    the first channel and the second channel of the dual-channel convolutional neural network are implemented as two identical neural networks that share a same set of layer parameters, each of the two identical neural networks configured to generate an item score for one of the item pairs; and the piecewise ranking loss algorithm maintains the scoring difference between the item pair of the multiple digital image items based on the scoring difference between the item pair exceeding a margin.

4. The computing system as recited in claim 1, wherein:
the different data batches are event types of different events;
the multiple digital image items of an event type are groups of digital images each associated with a type of the event; and
the fully-connected layers of the dual-channel convolutional neural network distinguish between the digital images of the event.

5. The computing system as recited in claim 1, wherein:
the different data batches are event types of different events;
the multiple digital image items of an event type are digital videos each associated with a type of the event; and
the fully-connected layers of the dual-channel convolutional neural network distinguish between image frames of the digital videos of the event.

6. The computing system as recited in claim 1, wherein the dual-channel convolutional neural network is configured to:
receive the input of the interleaved sequence of the item pairs of the multiple digital image items from the different data batches as sequential item subsets from the different data batches; and
train the respective classifier layers of the first channel and the second channel of the dual-channel convolutional neural network based on the input of the sequential item subsets.

7. The computing system as recited in claim 1, wherein the dual-channel convolutional neural network is configured to:
receive the input of the interleaved sequence of the item pairs of the multiple digital image items from the different data batches as random item subsets from random different data batches; and
train the respective classifier layers of the first channel and the second channel of the dual-channel convolutional neural network based on the input of the random item subsets.

8. The computing system as recited in claim 1, wherein the common features of the multiple digital image items comprise at least one of digital image features, graphic image features, and video image features.

9. A method for convolutional neural network joint training, the method comprising:
receiving an input of multiple digital image items of respective different data batches, the multiple digital image items of the different data batches having at least some common features, the input configured as an interleaved sequence of item pairs of the multiple digital image items from at least one of the different data batches, a first digital image item of an item pair being input to a first channel of a dual-channel convolutional neural network and a second digital image item of the item pair being input to a second channel of the dual-channel convolutional neural network;
training classifier layers of the dual-channel convolutional neural network to recognize the common features in the multiple digital image items of the different data batches, the respective classifier layers of the first channel and the second channel of the dual-channel convolutional neural network being trained simultaneously on all of the multiple digital image items of the different data batches;
inputting the recognized common features to fully-connected layers of the dual-channel convolutional neural network; and
distinguishing between the multiple digital image items of the different data batches based on the recognized common features in the multiple digital image items using the fully-connected layers of the dual-channel convolutional neural network.

10. The method as recited in claim 9, wherein:
the training includes training the classifier layers of the dual-channel convolutional neural network simultaneously except for the fully-connected layers of the dual-channel convolutional neural network; and
the fully-connected layers of the dual-channel convolutional neural network distinguishing between the multiple digital image items in the at least one of the different data batches that corresponds to a respective one of the fully-connected layers.

11. The method as recited in claim 9, wherein:
the receiving the input of the interleaved sequence of the item pairs of the multiple digital image items from the respective different data batches includes the first channel and the second channel of the dual-channel convolutional neural network receiving the input as sequential item subsets from the different data batches; and
the training includes training the respective classifier layers of the first channel and the second channel of the dual-channel convolutional neural network based on the input of the sequential item subsets.

12. The method as recited in claim 9, wherein:
the receiving the input of the interleaved sequence of the item pairs of the multiple digital image items from the respective different data batches includes the first channel and the second channel of the dual-channel convolutional neural network receiving the input as random item subsets from random different data batches; and
the training includes training the respective classifier layers of the first channel and the second channel of the dual-channel convolutional neural network based on the input of the random item subsets.

13. The method as recited in claim 9, further comprising:
determining a scoring difference between the item pairs of the multiple digital image items in the at least one of the different data batches; and
maintaining the scoring difference between the item pairs of the multiple digital image items utilizing a piecewise ranking loss algorithm, the scoring difference back propagated to train regression functions of the dual-channel convolutional neural network.

14. The method as recited in claim 13, wherein:
the first channel and the second channel of the dual-channel convolutional neural network are implemented as two identical neural networks that share a same set of layer parameters, each of the two identical neural networks generating an item score for one of the item pairs; and
the maintaining the scoring difference between the item pair of the multiple digital image items based on the scoring difference between the item pair exceeding a margin.

15. The method as recited in claim 9, wherein:
the different data batches are event types of different events;
the multiple digital image items of an event type are groups of digital images each associated with a type of the event; and
the fully-connected layers of the dual-channel convolutional neural network distinguish between the digital images of the event.

16. The method as recited in claim 9, wherein:
the different data batches are event types of different events;
the multiple digital image items of an event type are digital videos each associated with a type of the event; and
the fully-connected layers of the dual-channel convolutional neural network distinguish between image frames of the digital videos of the event.

17. A computer-readable storage memory comprising stored instructions that are executable and, responsive to execution of the stored instructions by a computing system, the computing system performs operations comprising:
inputting multiple digital image items of respective different data batches into a dual-channel convolutional neural network, the multiple digital image items of the different data batches having at least some common features, the inputting configured as an interleaved sequence of item pairs of the multiple digital image items from at least one of the different data batches, a first digital image item of an item pair being input to a first channel of the dual-channel convolutional neural network and a second digital image item of the item pair being input to a second channel of the dual-channel convolutional neural network;
determining a scoring difference between the item pairs of the multiple digital image items in the at least one of the different data batches;
utilizing a piecewise ranking loss algorithm to maintain the scoring difference between the item pairs of the multiple digital image items; and
training regression functions of the dual-channel convolutional neural network by back propagating the scoring difference into the dual-channel convolutional neural network.

18. The computer-readable storage memory as recited in claim 17, wherein:
the first channel and the second channel of the dual-channel convolutional neural network are implemented as two identical neural networks that share a same set of layer parameters, each of the two identical neural networks generating an item score for one of the item pairs; and
the piecewise ranking loss algorithm maintaining the scoring difference between the item pair of the multiple digital image items based on the scoring difference between the item pair exceeding a margin.

19. The computer-readable storage memory as recited in claim 17, wherein the computing system performs the operations further comprising:
training classifier layers of the dual-channel convolutional neural network to recognize the common features in the multiple digital image items of the different data batches, the respective classifier layers of the first channel and the second channel of the dual-channel convolutional neural network being trained simultaneously on all of the multiple digital image items of the different data batches, except for fully-connected layers of the dual-channel convolutional neural network;
inputting the recognized common features to the fully-connected layers of the dual-channel convolutional neural network; and
distinguishing between the multiple digital image items of the different data batches based on the recognized common features in the multiple digital image items using the fully-connected layers of the dual-channel convolutional neural network.

20. The computer-readable storage memory as recited in claim 17, wherein the computing system performs the operations further comprising inputting the interleaved sequence of the item pairs of the multiple digital image items from the respective different data batches into the dual-channel convolutional neural network as one of sequential or random item subsets from different ones of the different data batches.

* * * * *